United States Patent [19]

Besesty et al.

[11] Patent Number: 5,153,664
[45] Date of Patent: Oct. 6, 1992

[54] TELEMETRIC PROCESS AND APPARATUS

[75] Inventors: Pascal Besesty, Uriage; Philippe Trystram, Saint Egreve, both of France

[73] Assignee: Commissariat A l'Energie Atomique, Paris, France

[21] Appl. No.: 744,316

[22] Filed: Aug. 13, 1991

[30] Foreign Application Priority Data

Aug. 23, 1990 [FR] France .................. 90 10595

[51] Int. Cl.$^5$ .............................................. G01C 3/08
[52] U.S. Cl. ........................................ 356/5; 342/135; 368/120
[58] Field of Search .............. 356/4, 5; 342/135; 368/120

[56] References Cited

U.S. PATENT DOCUMENTS 3,428,815 2/1969 Thompson .
4,699,508 10/1987 Bölkow et al. .................... 356/5

FOREIGN PATENT DOCUMENTS 0066888 12/1982 European Pat. Off. .
0066889 12/1982 European Pat. Off. .
2036335 2/1972 Fed. Rep. of Germany .
3540157 11/1985 Fed. Rep. of Germany .

Primary Examiner—Mark Hellner
Attorney, Agent, or Firm—Pearne, Gordon, McCoy & Granger

[57] ABSTRACT

The invention relates to time of flight telemetry and has application to detection and imaging systems. Determination takes place of a response time of an optoelectronic measuring chain or cascade (20, 34, 36) able to measure an outward and return time (flight time) of a first light pulse emitted in the direction of an object whose distance is to be determined. This response time, determined by means of a second light pulse emitted and then detected by the measuring chain or cascade, is subtracted from the previously determined outward and return time in order to obtain a corrected time used for calculating the sought distance.

11 Claims, 1 Drawing Sheet

TELEMETRIC PROCESS AND APPARATUS

BACKGROUND OF THE INVENTION

The present invention relates to a telemetric process and apparatus. It more particularly applies to detection systems in the field of mobile robotics.

In order to be effective, certain types of mobile robots must be able to evaluate their environment over distances between 0.5 and 10 m. For this purpose the robots are equipped with one or more telemeters, which can make it possible to reconstitute an image of the environment.

Several telemeter types are known. A first type performs a triangulation in order to determine the distance from a reference point to a point on an object. The triangulation consists of measuring the angle formed by the direction of a continuous light beam and the direction under which the impact point of the beam on the object is seen by a detector. When carried out in this way, the distance measurement is precise, but suffers from a major disadvantage, namely that it only has a limited depth of field.

A second known telemeter type carries out phase shift measurements between a modulated light beam emitted towards a target and a beam reflected by said target. The knowledge of the phase shift makes it possible to determine the distance separating the telemeter from the target.

A major disadvantage of such a telemeter is the detection of parasitic reflections from indirect paths of the beam. Thus, as a result of the large aperture of the detector, it can collect beams having undergone multiple reflections on the target. In addition, the phase shift measured between these parasitic beams and the incident beam leads to erroneous information concerning the distance to be determined.

A third known telemeter type, called a flight time telemeter, uses the measurement of the outward and return time of a light pulse between the telemeter and the target for determining the distance separating them, which is possible because obviously the speed of light is known.

This type of telemeter obviates the multiple reflection and diffusion phenomena. Thus, the determination of the transit time is terminated during the first detection of a reflected light pulse (result of the shortest path) and the apparatus takes no account of any subsequently arriving parasitic pulse. Such a telemeter leads to accuracies of a few centimeters over a distance of about 10 meters. This accuracy can be further improved by determining the mean of a large number of measurements concerning the same impact point. However, this improvement is obtained to the detriment of the calculation time.

A first problem of flight time telemeters is caused by the very significant dynamics (which can reach $10^7$) of the light signals detected following a reflection on the target. Thus, the intensity of these signals is very intimately linked with the nature of the target. The reflection coefficient of the latter can change very suddenly from one point to another.

The electronic systems of the telemeter must be able to adapt to amplitude dispersions in order to retain a good accuracy on the light pulse path time measurement. For this purpose, automatic logarithmic amplification or gain checking devices are known. However, apart from the difficulty of constructing these devices, the fluctuation of their propagation time as a function of the dynamics of the detected signals makes them unusable in telemetry.

In flight time telemetry, a chronometer is activated simultaneously with the emission of a light pulse. This chronometer is stopped when a reflected pulse is detected. In order to stop the chronometer, use is presently made of a comparator, which emits a stop signal when it receives an electric signal corresponding to a light signal above a given threshold. However, such a comparator has a time spread on the emission time of the stop signal, as a function of the characteristics of the detection (dynamics, signal-to-noise ratio), which reduces the accuracy of the measurement.

SUMMARY OF THE INVENTION

The object of the present invention is to permit a telemetric measurement of the flight time type with an improved precision. Obviously the result is further improved by averaging a large number of measurements. Another object of the invention is to propose a reliable result, no matter what the dynamics of the detected light signal.

In order to achieve these objects, the invention recommends carrying out a measurement of the response time of the electronic circuits used during the determination of the transit time of the light pulse emitted and then detected. This response time is deducted from the transit time for calculating the distance. This correction made to the transit time makes it possible to improve the accuracy of the distance measurement.

More specifically, the present invention relates to a flight time telemetry process for determining the distance of an object by means of an optoelectronic measuring chain able to measure the outward and return time of a light pulse emitted in the direction of the object, said process comprising the stages of measuring the outward and return time, determining a response time of the optoelectronic measuring chain, subtracting the response time from the outward and return time measured to obtain a corrected time and calculating the sought distance from the corrected time, the determination of the response time being carried out under reception power conditions identical to those of the measurement of the outward and return time, wherein for determining the outward and return time, the process comprises the following stages:

(a) emitting a first light pulse in the direction of the object, whose distance is to be determined,
(b) simultaneously, activating time measuring means,
(c) detecting with the aid of detecting means a light pulse reflected by the object,
(d) following on to the detection performed in stage (c), activating stop control means for said time measuring means, and, for determining a response time of the measuring chain incorporating the detection means, the time measuring means and the stop control means, the process comprises the following stages:
(e) emitting a second light pulse,
(f) simultaneously, activating said time measuring means and
(g) detecting the second light pulse with the aid of the detecting means,
(h) and at the end of the detection of the second light pulse, the stop control means of said time measuring means are activated, in such a way that the measurement performed corresponds to the response time of the measuring chain.

In the invention, the determination of the response time is performed under reception power conditions identical to those of the measurement of the outward and return time, i.e. the second light pulse detected has the same time and amplitude characteristics as the light pulse reflected by the object. In this way, freedom is obtained from dispersions on signals propagating in the measuring chain or cascade and caused by intensity differences of the light pulse reflected by the target.

Moreover, in the present invention, use is made of only two light pulses, which makes it possible to rapidly carry out a measurement and obtain freedom of position variations of the object and vibrations of the latter.

Preferably, the second light pulse is emitted less than 100 microseconds following the first light pulse. The time interval separating the two light pulses is, e.g., less than a few dozen microseconds and is preferably less than 5 microseconds. In this way, temperature variations of the components of the measuring chain are very small between two light pulse emissions.

In a preferred embodiment, the inventive process also comprises the stages of measuring the power of the light pulse reflected by the object and regulating the power of the second light pulse as a function of the power of the reflected light pulse, so as to obtain a same detection level during the detection of the second light pulse as that obtained during the detection of the light pulse reflected by the object.

In this way, during the determination of the response time, the operating conditions are precisely those which occurred during the measurement of the outward and return time.

The present invention also relates to the apparatus for performing the process according to the invention. In a special embodiment of the apparatus, the latter comprises:

means for emitting light pulses and supplying on an output an activation signal at each emitted light pulse, first and second detecting means, stop control means supplying a stop signal on an output, a switch able to connect either the first detecting means or the second detecting means to an input of the stop control means, time measuring means connected by an input to said output of the means for emitting light pulses and by another input to said output of the stop control means, said measuring means supplying on an output a signal representing a measured time between activation and stopping, processing means connected by an input to the output of the time measuring means, said processing means being able to at least record the measurements performed by the time measuring means, subtract these measurement from one another and determine a distance on the basis of a time measurement.

The first and second detecting means can respectively comprise a first photodiode and a second photodiode. According to an advantageous embodiment, said photodiodes are identical and are preferably mounted on the same support, in order to avoid the intrinsic time spreads of photodiodes.

According to a special embodiment, the second detecting means comprise a means able to collect a given percentage of each light pulse supplied by the means for emitting the light pulses. The means able to collect a given percentage of each light pulse can be an optical fibre.

The apparatus according to the invention can have power measuring means connected on the one hand to the switch and on the other, at the output, to an input of the processing means, the latter being able to supply a rated power signal in relation with the power measurement on an output connected to an input of the means for emitting light pulses.

BRIEF DESCRIPTION OF THE DRAWINGS

The characteristics and advantages of the invention can be gathered from the following non-limitative, exemplified description with reference to the attached drawings, wherein show.

DETAILED DESCRIPTION OF THE PREFERRED EMBODIMENT

Figure 1:
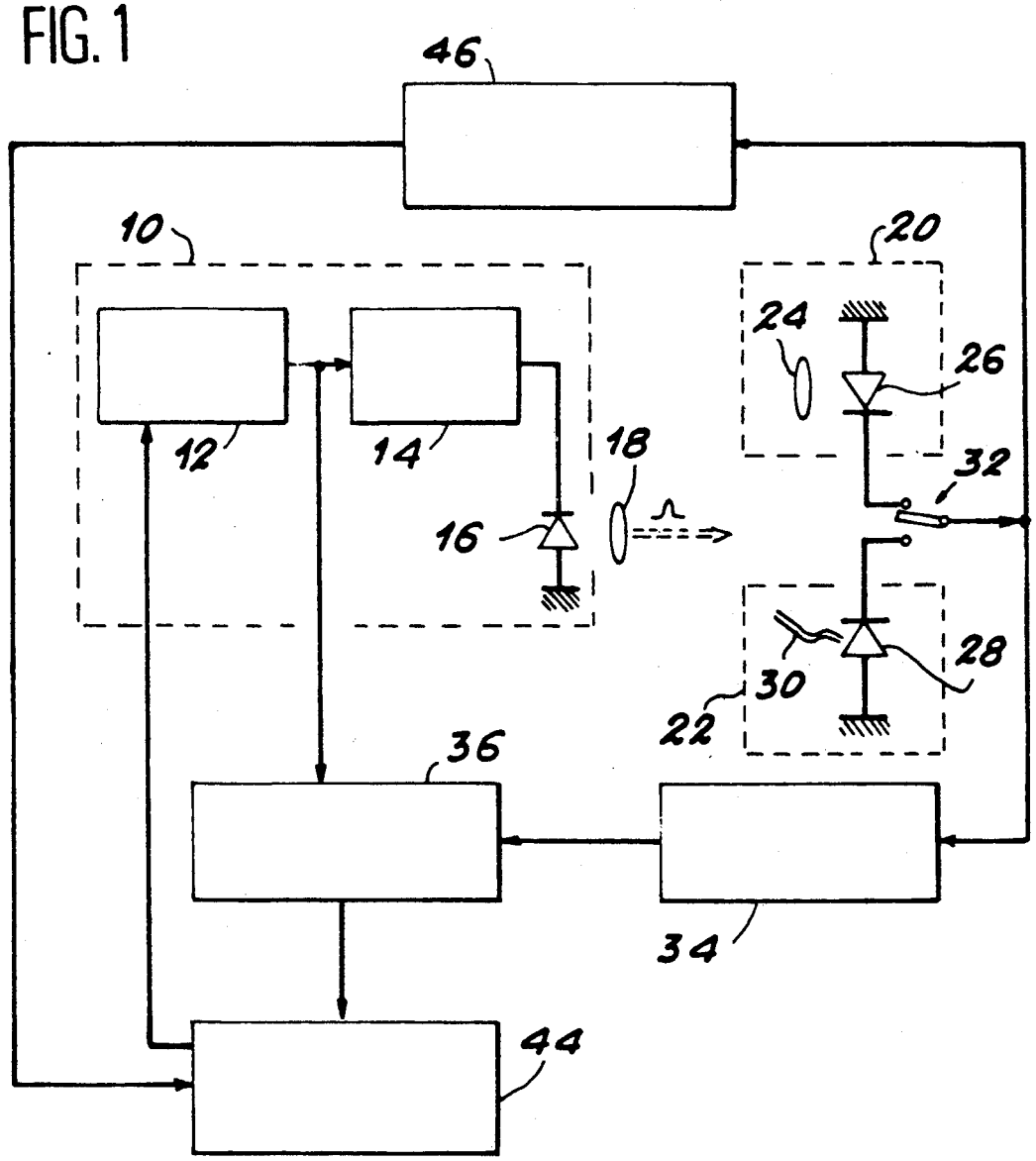
FIG. 1 Diagrammatically shows an apparatus according to the invention.

FIG. 1 diagrammatically shows a telemetry apparatus according to the invention for determining the distance separating an object (not shown) from said apparatus and has means 10 for emitting light pulses. In the embodiment shown, these means 10 comprise an electric pulse generator 12 connected to a control circuit 14 of a laser diode 16, which emits light pulses in the direction of the object.

The accuracy of the distance measurement is dependent on the rise time of the light pulses, the shorter the rise time, the better the precision. In order to form the light pulses supplied by the laser diode, use is made of fast components.

The pulse generator 12 is, e.g. formed by a quartz oscillator supplying a signal oscillating at a frequency of 200 MHz and connected to a combinational logic circuit which supplies, when it is activated by the processing means referred to hereinafter, an electric pulse of approximately 60 ns.

The pulse generator 12 also has a digital-analog converter receiving at the input a rated digital power value and which supplies at the output said power value in analog form. Simultaneously with the delivery of an electric pulse, the pulse generator 12 emits an activation or triggering signal on an output. The function of the latter will be made apparent hereinafter.

Under the effect of the electric pulse supplied by the generator 12, the control circuit 14 delivers a current supplying the laser diode 16. The intensity of said current is a function of the rated power value. The control circuit 14 also comprises fast components permitting rise times to the nominal value of the output current of approximately 1.3 ns or less, making it possible to produce light currents having time characteristics which are identical no matter what their amplitudes. These components are, e.g., based on gallium arsenide (AsGa) and are produced in emitter coupled logic (ECL) circuit technology.

The laser diode 16 is, e.g., of type SLD 202V-3 marketed by SONY. It supplies light pulses having a duration equal to that of the pulse supplied by the output of the generator 12. The light pulses emitted by the diode 16 are focussed by an objective 18, which can be a simple lens.

The apparatus also comprises first and second detecting means 20, 22 respectively. As can be seen in FIG. 1, the first detecting means 20 comprise an object 24, which can be a simple lens and which is positioned in front of a photodiode 26, e.g. of the avalanche PIN type. This photodiode 26 receives the light reflected by the object, when the latter has received a light pulse emitted by the diode 16.

The second detecting means 22 also comprise a photodiode 28, e.g. of the avalanche PIN type. The photodiodes 26, 28 are chosen in such a way as to have identical optoelectronic characteristics. The photodiode 28 is coupled to one end of an optical fiber 30, whose other end is positioned in the vicinity of the output of the means 10 for emitting light pulses. In this way, the photodiode 28 collects a given percentage of each light pulse supplied.

A switch 32, e.g. produced with a gallium arsenide-based technology, makes it possible to connect either the first detecting means 20, or the second detecting means 22 to the remainder of the electric circuit.

Stop control means 34 are connected to the switch 32 and e.g., comprise a comparator (not shown), e.g. produced with a gallium arsenide-based technology and peripheral control circuits (not shown) produced, e.g., in ECL technology.

These peripheral circuits make it possible to ensure the compatibility of the signals from the circuits produced in the different technologies and also control the measurement performance cycle (control of the switch 32, etc.), while still taking account of the firing orders.

Time measuring means 36 are connected by an input to the output of the pulse generator 12, which supplies an activating signal, and by another input to an output of the stop control means 34.

Figure 2:
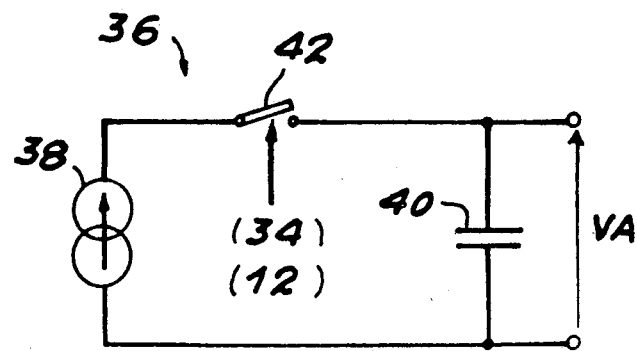
FIG. 2 Diagrammatically shows a time measuring means used in the apparatus according to the invention.

The time measuring means are advantageously constituted by a time-amplitude converter of the type diagrammatically shown in FIG. 2. Such a converter 36 has a constant current generator 38, which charges a linear charging capacitor 40 when the switch 42 is closed.

The closing of the switch 42 is controlled by the activating signal supplied by the pulse generator 12. Its opening is controlled by the stop signal supplied by the stop control means 34. When the switch 42 is open, the voltage VA at the terminals of the capacitor 40 is proportional to the time during which the switch 42 has remained closed.

The voltage VA is read by the processing means 44, which are, e.g., of the microprocessor type. These means 44 are able to perform various operations and to supply an activating signal for delivering an electric pulse by the pulse generator 12 and a rated power signal for the digital-analog converter of the generator 12.

While still remaining within the scope of the invention, other time measuring means types can be used. Reference is made to a counting mechanism comprising a clock supplying clock pulses, as well as a counter able to count these pulses between activation and stopping.

Reference is also made to a Vernier-equipped chronometry system. In this case, two clocks emit reciprocally phase-shifted clock pulses. As hereinbefore, the clock pulses are counted for the time between activation and stopping. Thus, a time measurement is obtained with the accuracy of the phase shift, whilst using clocks having a lower frequency than in the previously mentioned device.

On returning to FIG. 1, it can be seen that power measuring means 46 are also connected to the switch 32 and, at the output, to an input of the analysis and processing means 44.

For carrying out a measurement of the distance separating the flight time telemetry apparatus and a not shown object, the outward and return distance of a light pulse emitted by the laser diode 16 in the direction of the object is subject to chronometry. The processing means 44 emits a control signal accompanied by a rated power value in order to activate the emission of an electric pulse on the part of the pulse generator 12.

The emission of this electric pulse brings about the delivery of a light pulse at the desired power. The power is chosen at a maximum for said first light pulse. In addition, the electric pulse activates the time measuring means 36.

During this measurement, the switch 32 connects the first detecting means 20 to the remainder of the circuit. The detection of a light pulse reflected by the object activates the stop control means 34, which supplies a stop signal. The latter stops the time measurement, which is recorded by the processing means 44. Simultaneously, the power measuring means 46 measure the power of the reflected light pulse.

The time measurement does not take perfect account of the distance covered by the light pulse. Thus, the time measurement incorporates the outward and return time of the light pulse (flight time characteristic of the distance to be measured), but also the response time of the optoelectronic measuring chain comprising the photodiode 26, the stop control means 34 and the time measuring means 36. The response time is not a fixed factor and inter alia depends on the detected light power.

According to the invention, determination takes place of the measuring chain response time and then it is subtracted from the time measurement performed. This response time is determined under conditions identical to those of the measurement of the outward and return time.

For this purpose, the laser diode 16 emits a second light pulse having a power such that the same detection level and same time conditions are obtained (rise time, duration), during the detection of the second light pulse as the detection level and time conditions obtained during the detection of the reflected light pulse. Such a light power is obtained as a result of a rated power value supplied by the processing means 44 as a function of the measured power for the reflected light pulse. The rated power value takes account of the light proportion collected by the second detection means 22.

The emission of the second light pulse activates the time measuring means 36. The second light pulse is detected as soon as it is emitted by the second detecting means 22 now connected to the circuit by the switch 32.

This detection activates the stop means 34 under the same conditions as during the first measurement. The stop signal supplied by the stop control means 34 stops the time measurement performed by the time measuring means 36. The thus performed time measurement corresponds to the response time of the measuring chain under conditions identical to those of the preceding measurement.

The analysis and processing means 44 records this measurement of the response time and subtracts it from the measurement of the outward and return time in order to obtain a corrected time, which also takes account of other constant correctional factors (optical paths). The means 44 then calculates the sought distance on the basis of the corrected time.

The reading of the light power performed during the detection of the second pulse makes it possible to ensure the identity of the measurement conditions.

The accuracy of the distances calculated by the process and apparatus according to the invention are substantially equivalent to the accuracy conventionally obtained by averaging out a large number of measurements. It is clear that on performing the mean of a large number of measurements obtained by the process and with the apparatus according to the invention, said accuracy is improved. If the accuracy obtained with a single measurement is sufficient, further time is gained. In this way, there is a reduction of the time necessary for performing an image obtained by the laser beam sweeping the target in successive lines.

It should be noted that the invention requires no prior regulation of the power of the second light pulse prior to a measurement. During preliminary tests performed once and for all, a table is formed which is stored in the measuring chain and which gives the value Pe2 of the power of the second light pulse as a function of the value Pr1 of the light pulse received by the chain, following the emission of the first light pulse, in such a way that the value Pr2 of the light power received by the chain following the emission of the second light pulse is equal to Pr1. This makes it possible to emit the second light pulse very shortly after the emission of the first light pulse.

We claim:

1. A time of flight telemetry process for determining the distance to an object by means of an optoelectronic measuring chain able to measure an outward and return time of a light pulse emitted in the direction of the object, said process comprising stages as follows:
    a first stage for measuring the outward and return time, a second stage for determining a response time of the optoelectronic measuring chain, a third stage for subtracting the response time from the measured outward and return time to obtain a corrected time and a fourth stage for calculating the sought distance by means of the corrected time, the determination of the response time being carried out under reception power conditions identical to those of the measurement of the outward and return time, wherein, in the first stage:
    (a) a first light pulse is emitted in the direction of the object whose distance is to be determined and, simultaneously, time measuring means (36) are activated,
    (b) a light pulse reflected by the object is detected with the aid of detecting means (20, 22),
    (c) following the detection performed in stage (b), stop control means for stopping said time measuring means (36) are activated, and, in the second stage for determining a response time of the optoelectronic measuring chain incorporating the detecting means (20, 22), the time measuring means (36) and the stop control means (34), the process comprises the following stages:
    (d) a second light pulse is emitted and, simultaneously, said time measuring means (36) are activated and,
    (e) the second light pulse is detected with the aid of the detecting means (20, 22),
    (f) and at the end of the detection of the second light pulse, the stop control means for stopping said time measuring means (36) are activated, in such a way that the measurement performed corresponds to the response time of the measuring chain.

2. A process according to claim 1, wherein the second light pulse is emitted less than 100 microseconds after the first light pulse.

3. A process according to claim 1, wherein it also involves the stages of measuring the power of the light pulse reflected by the object, regulating the power of the second light pulse as a function of the power of the light pulse reflected so as to obtain the same detection level, during the detection of the second light pulse, as that obtained during the detection of the light pulse reflected by the object.

4. A time of flight telemetric apparatus for determining the distance to an object, said apparatus comprising:
    means (10) for emitting light pulses and supplying on an output an activation signal at each emitted light pulse,
    first (20) and second (22) detecting means,
    stop control means (34) supplying a stop signal on an output,
    a switch (32) able to connect either the first detecting means (20) or the second detecting means (22) to an input of the stop control means (34),
    time measuring means (36) connected by an input to said output of the means (10) for emitting light pulses and by another input to said output of the stop control means (34), said measuring means (36) supplying on an output a signal representing a measured time between activation and stopping,
    processing means (44) connected by an input to the output of the time measuring means (36), said processing means (44) being able to at least record the measurements performed by the time measuring means (36), subtract these measurement from one another and determine a distance on the basis of a time measurement so as to (a) measure an outward and return time of a first light pulse emitted by the emitting means in the direction of the object, a light pulse reflected by the object being detected by the first detecting means, (b) determine a response time of the apparatus by means of a second light pulse emitted by the emitting means and detected by the second detection means, (c) subtract the response time from the outward and return time to obtain a corrected time and (d) calculate the sought distance by means of the corrected time.

5. An apparatus according to claim 4, wherein the first (20) and second detecting means respectively comprise a first photodiode (26) and a second photodiode (28) and in that said photodiodes (26, 28) are identical.

6. An apparatus according to claim 4, wherein the second detecting means (22) comprises a means (30) able to collect a given percentage of each light pulse supplied by the means (10) for emitting the light pulses.

7. An apparatus according to claim 6, wherein the means able to collect a given percentage of each light pulse is an optical fiber (30).

8. An apparatus according to claim 4, wherein it has power measuring means (46) connected on the one hand to the switch (32) and on the other, at the output, to an input of the processing means (44), the latter being able to deliver a rated power signal in relation with the power measurement on an output connected to an input of the means (10) for emitting the light pulses.

9. A time of flight telemetry process for determining the distance to an object in the field of mobile robotics by means of an optoelectronic measuring chain able to measure an outward and return time of a light pulse emitted in the direction of the object, said process comprising stages as follows:

a first stage for measuring the outward and return time, a second stage for determining a response time of the optoelectronic measuring chain, a third stage for subtracting the response time from the measured outward and return time to obtain a corrected time and a fourth stage for calculating the sought distance by means of the corrected time, the determination of the response time being carried out under reception power conditions identical to those of the measurement of the outward and return time, wherein, in the first stage:

(a) a first light pulse is emitted in the direction of the object whose distance is to be determined and, simultaneously, time measuring means (36) are activated, (b) a light pulse reflected by the object is detected with the aid of detecting means (20, 22), (c) following the detection performed in stage (b), stop control means for stopping said time measuring means (36) are activated, and, in the second stage for determining a response time of the optoelectronic measuring chain incorporating the detecting means (20, 22), the time measuring means (36) and the stop control means (34), the process comprises the following stages:

(d) a second light pulse is emitted and, simultaneously, said time measuring means (36) are activated and, (e) the second light pulse is detected with the aid of the detecting means (20, 22), (f) and at the end of the detection of the second light pulse, the stop control means for stopping said time measuring means (36) are activated, in such a way that the measurement performed corresponds to the response time of the measuring chain, and wherein the second light pulse is emitted less than 5 microseconds after the first light pulse.

10. A process according to claim 9, wherein said optoelectronic measuring chain equips a mobile robot, wherein said object belongs to the environment of said robot and wherein the image of said object is reconstituted by scanning the object along successive lines and determining the said distance for each point of the lines.

11. A process according to claim 3, wherein the power of the second light pulse is regulated by means of a table which is formed during preliminary tests performed once and for all, wherein said table is stored in the measuring chain and gives the value Pe2 of the power of the second light pulse as a function of the value Pr1 of the light pulse received by the chain, following the emission of the first light pulse, in such a way that the value Pr2 of the light power received by the chain following the emission of the second light pulse is equal to Pr1.

* * * * *